(12) United States Patent
Da et al.

(10) Patent No.: US 9,117,105 B2
(45) Date of Patent: Aug. 25, 2015

(54) 3D FACE RECOGNITION METHOD BASED ON INTERMEDIATE FREQUENCY INFORMATION IN GEOMETRIC IMAGE

(75) Inventors: Feipeng Da, Nanjing (CN); Zhaoyang Wang, Nanjing (CN)

(73) Assignee: Southeast University, Jiangsu (CN)

( * ) Notice: Subject to any disclaimer, the term of this patent is extended or adjusted under 35 U.S.C. 154(b) by 0 days.

(21) Appl. No.: 14/364,280

(22) PCT Filed: Feb. 28, 2012

(86) PCT No.: PCT/CN2012/071728
§ 371 (c)(1),
(2), (4) Date: Jun. 10, 2014

(87) PCT Pub. No.: WO2013/091304
PCT Pub. Date: Jun. 27, 2013

(65) Prior Publication Data
US 2014/0355843 A1 Dec. 4, 2014

(30) Foreign Application Priority Data
Dec. 21, 2011 (CN) .......................... 2011 1 0431073

(51) Int. Cl.
*G06K 9/00* (2006.01)
(52) U.S. Cl.
CPC ........ *G06K 9/00201* (2013.01); *G06K 9/00214* (2013.01); *G06K 9/00221* (2013.01); *G06K 9/00268* (2013.01)
(58) Field of Classification Search
CPC .......... G06K 9/00201; G06K 9/00214; G06K 9/00268; G06K 9/00221
See application file for complete search history.

(56) References Cited

U.S. PATENT DOCUMENTS

2002/0159627 A1   10/2002   Schneiderman et al.
2009/0310828 A1   12/2009   Kakadiaris et al.

FOREIGN PATENT DOCUMENTS

CN              101986328 A        3/2011

OTHER PUBLICATIONS

Kakadiaris et al., "Three Dimensional Face Recognition in the Presence of Facial Expressions: An Annotated Deformable Model Approach", Apr. 2007, IEEE Trans. on Pattern Analysis and Machine Intelligence, vol. 29, No. 4, p. 640-649.*

(Continued)

*Primary Examiner* — Stephen R Koziol
*Assistant Examiner* — Timothy Choi
(74) *Attorney, Agent, or Firm* — Christie, Parker & Hale, LLP

(57) ABSTRACT

A 3D face recognition method based on intermediate frequency information in a geometric image as follows: (1) preprocessing a library and test models of 3D faces, including 3D face area cutting, smoothing processing and point cloud thinning, and discarding the lower portion of the face; (2) mapping the remainder of the face to a 2D grid using grid parameters, and performing linear interpolation on the 3D coordinates of the grid top to acquire the 3D coordinate attributes and generating a geometric image of a 3D face model; (3) performing multi-scale filtering with a multi-scale Haar wavelet filter to extract horizontal, vertical, and diagonal intermediate frequency information image images as invariable facial features; (4) calculating the similarity between the test model and the library set model with a wavelet domain structuring similarity algorithm; and (5) judging the test and library set model models with the maximum similarity belong to the same person.

2 Claims, 5 Drawing Sheets
(3 of 5 Drawing Sheet(s) Filed in Color)

(56) References Cited

OTHER PUBLICATIONS

Sampat et al., "Complex Wavelet Structural Similarity: A New Image Similarity Index", Nov. 2009, IEEE Trans. on Image Processing, vol. 18, No. 11, p. 2385-2401.*

Abate et al., "2D and 3D face recognition: A survey", Jan. 26, 2007, Pattern Recognition Letters 28, p. 1885-1906.*

CN101986328 English Machine Translation of the Description Mar. 2011.*

International Search Report, corresponding to PCT/CN2012/071728, dated Jul. 19, 2012, 4 pages.

Cai, et al., "Three dimensions face recognition be using shape filtering and geometry image," Journal of Image and Graphics, Jul. 2011, vol. 16, No. 7, pp. 1303-1309.

* cited by examiner

3D FACE RECOGNITION METHOD BASED ON INTERMEDIATE FREQUENCY INFORMATION IN GEOMETRIC IMAGE

CROSS-REFERENCE TO RELATED APPLICATION

This application is a National Phase Patent Application and claims priority to and benefit of International Application Number PCT/CN2012071728, filed on Feb. 28, 2012, which claims priority to and benefit of Chinese Patent Application No. 201110431073.2 filed on Dec. 21, 2011, the entire disclosures of which are incorporated herein by reference.

BACKGROUND

1. Field

Embodiments of the present invention relate to a three-dimensional face recognition method based on intermediate frequency information in a geometric image, wherein a pre-treated three-dimensional face model is processed by mesh parameterization and linear interpolation to obtain a geometric image, intermediate frequency information images with identity discriminability are extracted from the geometric image as expression invariant features of the three-dimensional face model with a multi-scale Haar wavelet filter, the degree of similarity of intermediate frequency information images between the test model and the library model is calculated with a Wavelet Domain Structure Similarity algorithm to judge the identity of the test model. The intermediate frequency information image in three-dimensional face model set forth in the present invention has high identity representation capability, and effectively decreases the impact of expression variation on three-dimensional face recognition. With a Wavelet Domain Structure Similarity algorithm, the structural information similarity of an intermediate frequency information image between the test model and the library model is calculated accurately, and thereby the recognition rate of the three-dimensional face recognition method is significantly improved.

2. Description of the Related Art

Biometric recognition takes an important role in the security domain; especially, compared with other feature recognition technologies, such as fingerprint recognition and iris recognition, automatic face recognition technology has received more and more attention and has a broad development space, owing to its advantages such as its contactless nature, high acceptability, and high unobtrusiveness, etc.

Conventional photo image based face recognition technology is restricted by factors such as illumination, posture, and make-up, etc.; in contrast, three-dimensional face recognition technology can overcome or mitigate the adverse impacts of these factors. A three-dimensional face model has richer information than a two-dimensional image, and can characterize the true spatial form of a face more accurately. However, a three-dimensional face model involves high data volume, more interference regions, and high computational complexity; in addition, the non-rigid distortion resulted from facial expression may cause degraded performance of a geometric information based three-dimensional face recognition method. Therefore, how to decrease computational complexity and mitigate the impact of facial expression is a bottleneck in the three-dimensional face recognition technology as well as a key challenge in the research.

SUMMARY

Embodiments of the present invention provides a three-dimensional face recognition method based on intermediate frequency information in a geometric image, which can improve the recognition rate.

Embodiments of the present invention employs the following technical solution:

A three-dimensional face recognition method based on intermediate frequency information in geometric image, wherein the geometric image of a test model and the geometric images of a library model are filtered by a multi-scale Haar wavelet filtering, to obtain horizontal intermediate frequency information image, vertical intermediate frequency information image, and diagonal intermediate frequency information image of the test model and the library model respectively; the degrees of similarity of corresponding intermediate frequency information images are calculated with Wavelet Domain Structure Similarity algorithm respectively and the similarity values are summed up and the sum is taken as total degree of similarity between the test model and the library model; finally, the library model with the maximum degree of similarity is taken as the recognition result, according to the degree of similarity between the test face and each library face in the three-dimensional face library. The process comprises a pre-treatment step, an intermediate frequency information image extraction step, a Wavelet Domain Structure Similarity calculation step, and a recognition step.

Step 1: Making a pre-treatment of a test model and a pre-treatment of a library model, wherein the making of either pre-treatment involves:

Step 1.1 Face cutting

Locate a nose tip point from a plurality of points according to a shape index feature and geometric constraints of a facial point cloud, define a sphere with the nose tip point as a center of the sphere and a radius of 90 mm, discard outside points of the plurality of points that are outside of the sphere, wherein the facial point cloud comprising the points that are within the sphere;

Step 1.2 Facial surface smoothing

Carry out posture correction for the facial point cloud by principal component analysis (PCA), to obtain 3 orthogonal axial directions; take the nose tip point as an origin, choose a first eigenvector corresponding to a maximum eigenvalue as Y-axis, choose a second eigenvector corresponding to a minimum eigenvalue as Z-axis, establish a right-handed spatial three-dimensional coordinate system, wherein each point in the facial point cloud can be denoted by coordinates x, y, and z uniquely in the right-handed spatial three-dimensional coordinate system;

Carry out triangularization for the facial point cloud in the right-handed spatial three-dimensional coordinate system, to obtain spatial triangular meshes; smooth the facial triangular meshes with a mesh-based smoothing algorithm for 10 iterations for noise removal, to obtain surface smoothed three-dimensional facial meshes;

Step 1.3 Cutting of upper face

Discard the points below a y=−10 plane among the three-dimensional facial meshes, and keep an upper part of the three-dimensional face that is less affected by facial expression;

Step 1.4 Diluting of facial point cloud

Take samples from the facial point cloud evenly by a spatial distance at a 1 mm interval, to obtain a diluted point cloud; carry out triangular meshing for the diluted point cloud, calculate and save side lengths $\gamma_{l1}, \gamma_{l2}, \gamma_{l3}$ ($l=1, 2, \ldots, \eta$) of each spatial triangular patch among the generated three-dimensional facial meshes, where, η is the number of triangular patches among the meshes, and the average side length among all triangular patches is $\bar{\gamma}$; if any spatial triangular patch has a side with a length greater than $4\bar{\gamma}$, discard the spatial triangular patch but keep vertexes of the spatial triangular patch;

Step 2 Mapping and extracting of intermediate frequency information in a geometric image.

Step 2.1 Mapping the coordinate information of facial point clouds of the test model and the library model to a plane respectively, to form geometric images of the test model and the library model respectively, wherein the method for obtaining the geometric images is as follows:

Step 2.1.1 Meshing parameterization

Map the boundary points among the pre-treated three-dimensional facial point meshes to four sides of a square in size of 512×512 pixels, and map the other points among the three-dimensional facial point meshes except the boundary points to the area within the square by mesh parameterization, to obtain planar meshes φ; take any vertex of the square as origin, take the directions in which two sides intersect at the origin as positive directions, and establish a counter-clockwise coordinate system MON, wherein any point in the plane can be denoted uniquely by coordinates m and n; on the four sides of the square, take b points evenly in counter-clockwise direction, starting from the origin, wherein the coordinates of the sampled points are $(m_t^0, n_t^0)$ (t=1, 2, ... b), b is the number of boundary points among the three-dimensional facial point meshes;

Denote the vertexes of the three-dimensional facial point meshes as $f_q$ (q=1, 2, ..., τ), where, τ is the number of vertexes, the coordinates of corresponding points mapped from the vertexes to the area within the square are $(m_q, n_q)$, where, $m_q$ and $n_q$ are solutions of the following linear equation set:

$$\begin{cases} Lm_q = Ln_q = 0, \forall f_q \notin B \\ m_q = m_q^0, n_q = n_q^0, \forall f_q \in B, \end{cases}$$

Where, L is the Laplacian matrix of the three-dimensional facial point meshes, and B is the set of boundary points among the three-dimensional facial point meshes;

Step 2.1.2 Generate a geometric image.

Append the three-dimensional coordinates of the vertexes $f_q=(x_q, y_q, z_q)$ among the facial point meshes to the corresponding points $(m_q, n_q)$ as attributes of the points $(m_q, n_q)$; determine the attributes of the pixel points within the area of the square by linear interpolation, to obtain a two-dimensional image with three-dimensional coordinate attributes, which is referred to as a geometric image G;

Step 2.2 Filter the geometric images G of the test model and the library model respectively, to obtain intermediate frequency information of the test model and the library model, wherein the method of filtering geometric image is as follows:

Step 2.2.1 Carrying out multi-scale Haar wavelet filtering for the geometric image G Step 2.2.1.1 Carrying out row transformation and column transformation for the geometric image G with a Haar transformation matrix sequentially, to obtain a low frequency coefficient set and horizontal, vertical, and diagonal high frequency coefficient sets; denote the low frequency coefficient set as $LL_1$, and denote the horizontal, vertical, and diagonal high frequency coefficient sets as $HL_1$, $LH_1$, and $HH_1$ respectively;

Step 2.2.1.2 Carrying out Haar wavelet filtering for the low frequency coefficient set $LL_1$ again in the same way as that described in step 2.2.1.1, and output secondarily filtered low frequency coefficient set and horizontal, vertical, and diagonal high frequency coefficient sets, which are denoted as $LL_2$, $HL_2$, $LH_2$, and $HH_2$ respectively; repeat the filtering for 5 cycles, with the low frequency coefficient set obtained in the precious cycle as the input in each filtering cycle, and output new low frequency coefficient set and horizontal, vertical, and diagonal high frequency coefficient sets;

Step 2.2.2 Extracting intermediate frequency information images

Extracting and saving the horizontal high frequency coefficient set $HL_5$, vertical high frequency coefficient set $LH_5$, and diagonal high frequency coefficient set $HH_5$ that are outputted in the last filtering cycle, take the elements in $HL_5$, $LH_5$, and $HH_5$ as attributes of the pixels, and construct three images in size of 16×16 pixels, which are referred to as horizontal intermediate frequency information image, vertical intermediate frequency information image, and diagonal intermediate frequency information image respectively;

Step 3: Calculating the degree of similarity between the test model and the library model with wavelet domain structure similarity algorithm respectively, wherein the method of calculation is as follows:

Step 3.1 Calculating the degree of similarity $S_{HL}$ between the horizontal intermediate frequency information image of the test model and the horizontal intermediate frequency information image of the library model, the degree of similarity $S_{HL}$ between the vertical intermediate frequency information image of the test model and the vertical intermediate frequency information image of the library model, and the degree of similarity $S_{HH}$ between the diagonal intermediate frequency information image of the test model and the diagonal intermediate frequency information image of the library model, sum up $S_{HL}$, $S_{LH}$, and $S_{HH}$, and take the sum as the degree of similarity between the test model and the library model, wherein the $S_{HL}$, $S_{LH}$, and $S_{HH}$ are obtained with the horizontal intermediate frequency information image, vertical intermediate frequency information image, and diagonal intermediate frequency information image to be matched and are calculated with wavelet domain structure similarity algorithm; the wavelet domain structure similarity algorithm is as follows:

Step 3.1.1 Sorting the x attribute of all pixels in the horizontal intermediate frequency information image, vertical intermediate frequency information image, and diagonal intermediate frequency information image in the order of corresponding pixel respectively, according to the three attributes (x,y,z) of each pixel in the horizontal intermediate frequency information image, vertical intermediate frequency information image, and diagonal intermediate frequency information image, and construct an x channel for the horizontal intermediate frequency information image, vertical intermediate frequency information image, and diagonal intermediate frequency information image respectively; in the same way, construct and obtain y channels and z channels for the horizontal intermediate frequency information image, vertical intermediate frequency information image, and diagonal intermediate frequency information image, and denote the channels as:

$$C^\chi = \begin{bmatrix} c_{1,1} & c_{1,2} & \cdots & c_{1,16} \\ c_{2,1} & c_{2,2} & \cdots & c_{2,16} \\ \vdots & \vdots & \ddots & \vdots \\ c_{16,1} & c_{16,2} & \cdots & c_{16,16} \end{bmatrix},$$

where, χ is x, y, or z, $C^\chi$ represents x channel, y channel, or z channel, $c_{1,1}$ is the element in row 1 and column 1 in $C^\chi$, $c_{1,2}$ is the element in row 1 and column 2 in $C^x$, ..., $c_{2,1}$ is the element in row 2 and column 1 in $C^x$, ..., and $c_{16,16}$ is the element in row 16 and column 16 in $C^x$; the horizontal intermediate frequency information image, vertical intermediate frequency information image, or diagonal intermediate frequency information image is referred to as an intermediate frequency information image; calculate the degree of similarity $s^x$ of x channel, degree of similarity $s^y$ of y channel, and degree of similarity $s^z$ of z channel between two intermediate frequency information images to be matched, sum up $s^x$, $s^y$, and $s^z$, and take the sum as the degree of similarity $S_{HL}$, $S_{LH}$, or $S_{HH}$ between the two intermediate frequency information images to be matched, wherein the $s^x$, $s^y$, and $s^z$ are obtained with the following method:

The x, y, or z channel of an intermediate frequency information image of the test model is represented by $$C_p^x = \begin{bmatrix} c_{1,1}^p & c_{1,2}^p & \cdots & c_{1,16}^p \\ c_{2,1}^p & c_{2,2}^p & \cdots & c_{2,16}^p \\ \vdots & \vdots & \ddots & \vdots \\ c_{16,1}^p & c_{16,2}^p & \cdots & c_{16,16}^p \end{bmatrix},$$

and the same channel of the corresponding intermediate frequency information image of the library model is represented by $$C_g^x = \begin{bmatrix} c_{1,1}^g & c_{1,2}^g & \cdots & c_{1,16}^g \\ c_{2,1}^g & c_{2,2}^g & \cdots & c_{2,16}^g \\ \vdots & \vdots & \ddots & \vdots \\ c_{16,1}^g & c_{16,2}^g & \cdots & c_{16,16}^g \end{bmatrix},$$

where, p indicates $C_p^x$ comes from the test model, g indicates $C_g^x$ comes from the library model; the number of rows and number of columns of elements in $C_p^x$ and $C_g^x$ are denoted as $\alpha$ and $\beta$ respectively, a 3×3 pixel neighboring region in $C_p^x$ is represented by $$C_p^x(\alpha, \beta) = \begin{bmatrix} c_{\alpha-1,\beta-1}^p & c_{\alpha-1,\beta}^p & c_{\alpha-1,\beta+1}^p \\ c_{\alpha,\beta-1}^p & c_{\alpha,\beta}^p & c_{\alpha,\beta+1}^p \\ c_{\alpha+1,\beta-1}^p & c_{\alpha+1,\beta}^p & c_{\alpha+1,\beta+1}^p \end{bmatrix},$$

the element $c_{\alpha,\beta}^p$ is the central element in the 3×3 pixel neighboring region in $C_p^x$, a 3×3 pixel neighboring region in $C_g^x$ is represented by $$C_g^x(\alpha, \beta) = \begin{bmatrix} c_{\alpha-1,\beta-1}^g & c_{\alpha-1,\beta}^g & c_{\alpha-1,\beta+1}^g \\ c_{\alpha,\beta-1}^g & c_{\alpha,\beta}^g & c_{\alpha,\beta+1}^g \\ c_{\alpha+1,\beta-1}^g & c_{\alpha+1,\beta}^g & c_{\alpha+1,\beta+1}^g \end{bmatrix},$$

the element $c_{\alpha,\beta}^g$ the central element in the 3×3 pixel neighboring region in $C_g^x$, and the structural similarity $\tilde{s}^x(\alpha,\beta)$ between $c_{\alpha,\beta}^p$ and $c_{\alpha,\beta}^g$ is:

$$\tilde{s}^x(\alpha, \beta) = \frac{\left(2 \sum_{e1=\alpha-1}^{\alpha+1} \sum_{e2=\beta-1}^{\beta+1} |c_{e1,e1}^p||c_{e1,e2}^g| + 0.1\right) \left(2\left|\sum_{e1=\alpha-1}^{\alpha+1} \sum_{e2=\beta-1}^{\beta+1} c_{e1,e2}^p (c_{e1,e2}^g)^*\right| + 0.1\right)}{\left(\sum_{e1=\alpha-1}^{\alpha+1} \sum_{e2=\beta-1}^{\beta+1} |c_{e1,e2}^p|^2 + \sum_{e1=\alpha-1}^{\alpha+1} \sum_{e2=\beta-1}^{\beta+1} |c_{e1,e2}^g|^2 + 0.1\right) \left(2 \sum_{e1=\alpha-1}^{\alpha+1} \sum_{e2=\beta-1}^{\beta+1} |c_{e1,e2}^p (c_{e1,e2}^g)^*| + 0.1\right)}$$

where, e1 and e2 represent the row suffix and column suffix of the elements in $C_p^x(\alpha,\beta)$ and $C_g^x(\alpha,\beta)$, and $(c_{e1,e2}^g)^*$ is the conjugate value of $c_{e1,e2}^g$;

Let $\alpha=2, 3, \ldots, 15$, $\beta=2, 3, \ldots, 15$, take the average of $\tilde{s}^x(\alpha,\beta)$ as the structural similarity between $C_p^x$ and $C_g^x$:

$$s^x = \frac{1}{196} \sum_{\alpha=2}^{15} \sum_{\beta=2}^{15} \tilde{s}^x(\alpha, \beta);$$

Step 4: Identity recognizing of three-dimensional face

Repeat steps 1 to 3, to obtain the degree of similarity between the test model and each library model, compare the degrees of similarity between the test model and each library model, and judge that the library model with the maximum degree of similarity is of the same identity as the test model.

In view of the expression variation problem in three-dimensional face recognition in the prior art, the present invention provides a three-dimensional face recognition method, which utilizes intermediate frequency information images as expression invariant features and uses wavelet domain structure similarity algorithm to calculate the degree of similarity between the test model and the library model.

From the visual viewpoint, the facial information described by a three-dimensional face model consists of three parts: overall information that represents facial contour and appearance, detail information that represents individual facial features, and noise information that represents subtle facial textures. Whenever the facial expression changes, especially when the mouth opens, the contour and appearance (i.e., overall information) will have significant distortion, while the individual facial features (i.e., detail information) will not change accordingly. Therefore, the three-dimensional facial detail information is chosen as expression invariant features, and the matching between the test model and the library model is translated to matching between expression invariant features. In the present invention, a three-dimensional face model is mapped to a geometric image; then, the geometric image is divided with a multi-scale Haar wavelet filter into sub-images that contain information in different frequency bands, wherein the information within intermediate frequency band corresponds to detail information; the sub-images that contain information in intermediate frequency band are extracted as three-dimensional facial expression invariant features, and are referred to as intermediate frequency information images. Finally, the degree of similarity between the intermediate frequency information images of the test model and the intermediate frequency information images of each library model are calculated with wavelet domain structure similarity algorithm, and the degrees of similarity between the test model and each library model in the three-dimensional face library are compared, and the library model with the maximum degree of similarity is judged to be of the same identity as the test model.

The present invention has the following advantages and characteristics:

1) The facial point cloud is diluted. Usually, the denser a point cloud is, the more the information contained in the point cloud will be, but the longer the processing time will be. For long, a trade-off has to be made for that reason. However, when a geometric image is generated, mesh parameterization and linear interpolation algorithm will not loss a great deal of useful information even though the point cloud is diluted. On the contrary, if no dilution is carried out, to obtain a geometric image of three-dimensional face model, the computation load will increase geometrically, bringing severe impact on the recognition efficiency and real-time performance.

2) Three-dimensional facial shape information is converted to the frequency domain, and intermediate frequency information images are extracted as expression invariant features. In the present invention, facial information is converted to the frequency domain by means of a multi-scale Haar wavelet filter, and the information in frequency domain is resolved to non-overlapping frequency bands, wherein the information in low-frequency band corresponds to overall facial information, the information in intermediate frequency band corresponds to detail facial information, and the information in high-frequency band corresponds to noise information. Owing to the fact that the detail facial information has higher identity discriminability and expression invariability, sub-images that contain intermediate frequency information are extracted as three-dimensional face recognition features in the present invention, and the sub-images are referred to as intermediate frequency information images. In addition, with the multi-scale Haar wavelet filter, horizontal, vertical and diagonal intermediate frequency information images can be generated, wherein the horizontal intermediate frequency information image reflects marginal facial information in horizontal direction, and characterizes horizontal facial features such as eyes and mouth; the vertical intermediate frequency information image contains marginal facial information in vertical direction, and characterizes vertical facial features such as nose etc.; the diagonal intermediate frequency information image contains marginal facial information in diagonal direction. The horizontal, vertical and diagonal intermediate frequency information images are used together as three-dimensional expression invariant features, so that three-dimensional detail facial information are fully captured and represented, and this detail facial information has strong expression robustness.

3) The degree of similarity is calculated with wavelet domain structure similarity algorithm. The wavelet domain structure similarity algorithm is extended and improved from the conventional structural similarity algorithm in wavelet domain. It inherits the advantages of structure similarity algorithm and is more suitable for calculation of the degree of similarity of intermediate frequency information images in wavelet domain. The structure similarity algorithm quantitatively calculates the structural information difference between images to be matched in the same way as the human visual system percepts images. In the present invention, the structural similarities of horizontal, vertical, and diagonal intermediate frequency information images between the test model and the library model are calculated in wavelet domain respectively, and the identity of the tested face is judged according to the total degree of similarity of the intermediate frequency information images. Since the local features in different areas of a face contain rich detail information, when the degree of similarity between the test model and the library model is calculated, the degree of similarity in local structure between the pixels in the intermediate frequency information images of the test model and the corresponding pixels in corresponding intermediate frequency information images of the library model is calculated in the present invention, and finally the average local similarity is taken as the degree of similarity between the intermediate frequency information images. Compared to the conventional error-based similarity algorithm, the wavelet domain structure similarity algorithm used in the present invention can provide a recognition result that is consistent with the perceptual habit of human visual system, and improves the recognition accuracy of the three-dimensional face recognition system to some degree.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
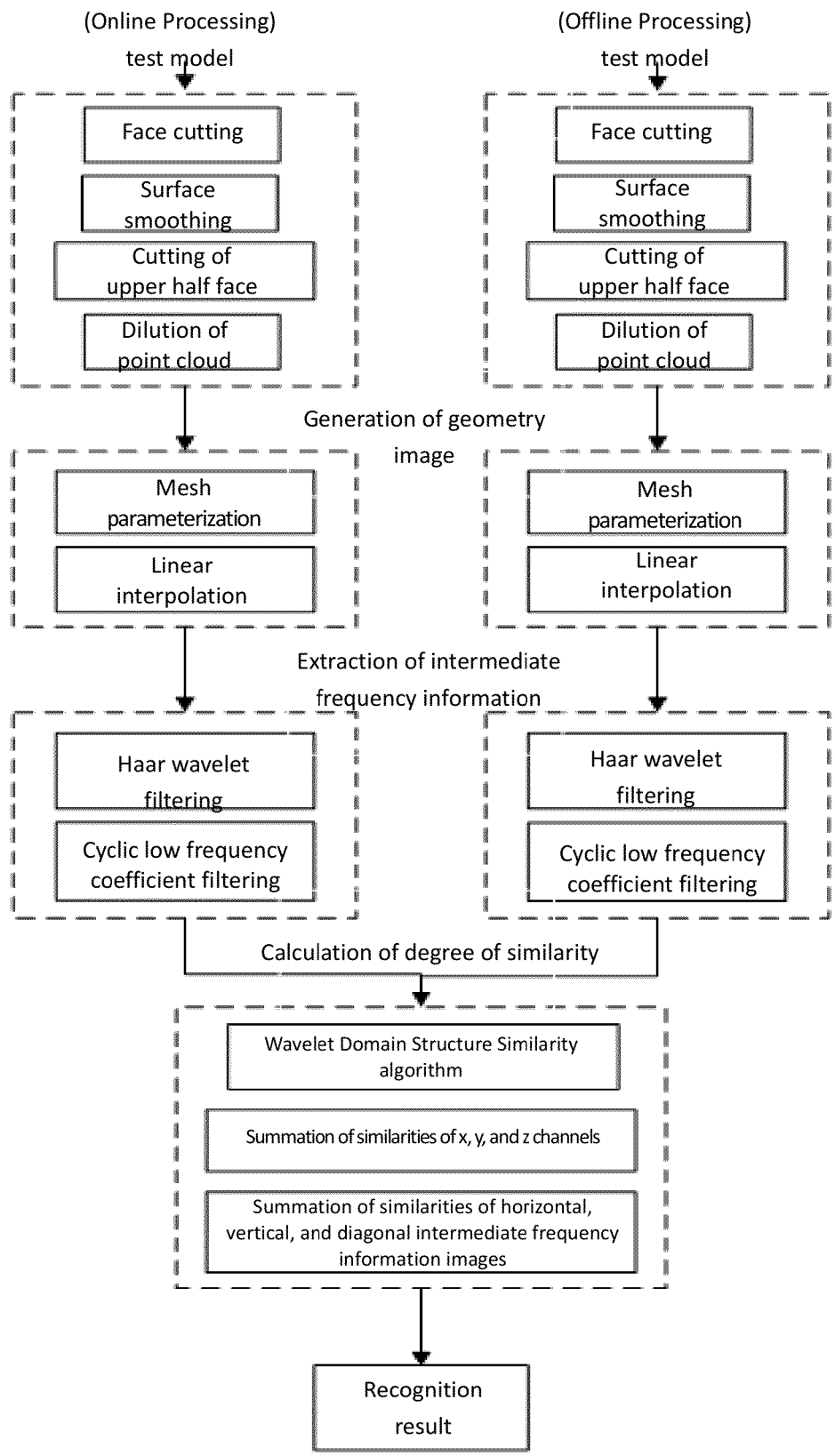
FIG. 1 is a flow chart of the three-dimensional face recognition method disclosed in the present invention.
Figure 2:
FIG. 2 shows an original face.
Figure 3:
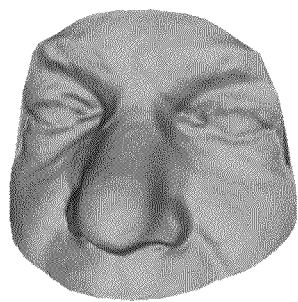
FIG. 3 shows a smoothed upper half face.
Figure 4:
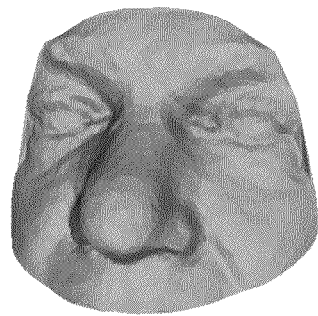
FIG. 4 shows the upper half face after point cloud dilution.
Figure 5:
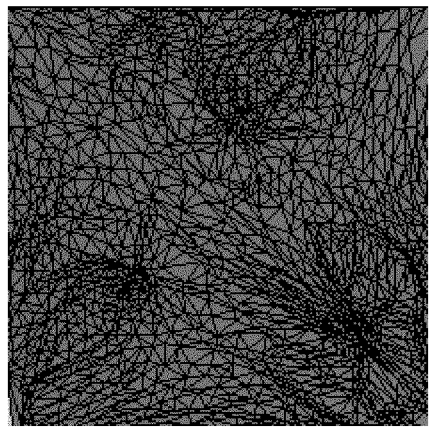
FIG. 5 shows parameterized meshes.
Figure 6:
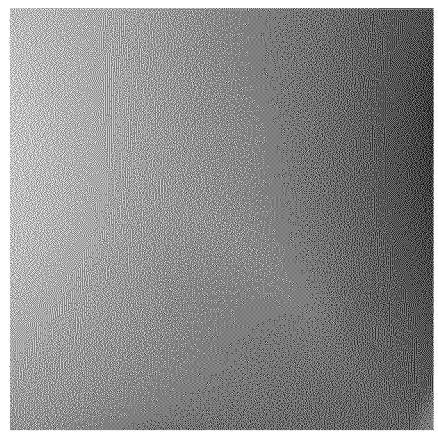
FIG. 6 shows a gray-scale geometric image.
Figures 7, 8:
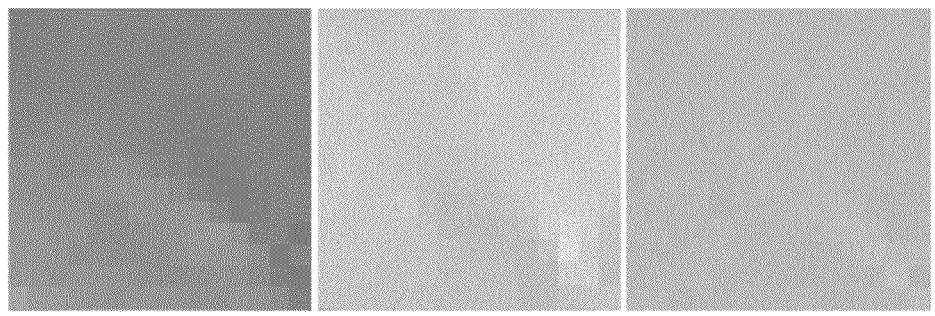
FIG. 7 is a schematic diagram of multi-scale wavelet filtering.
FIG. 8 shows horizontal, vertical, and diagonal intermediate frequency information images.
Figure 9:
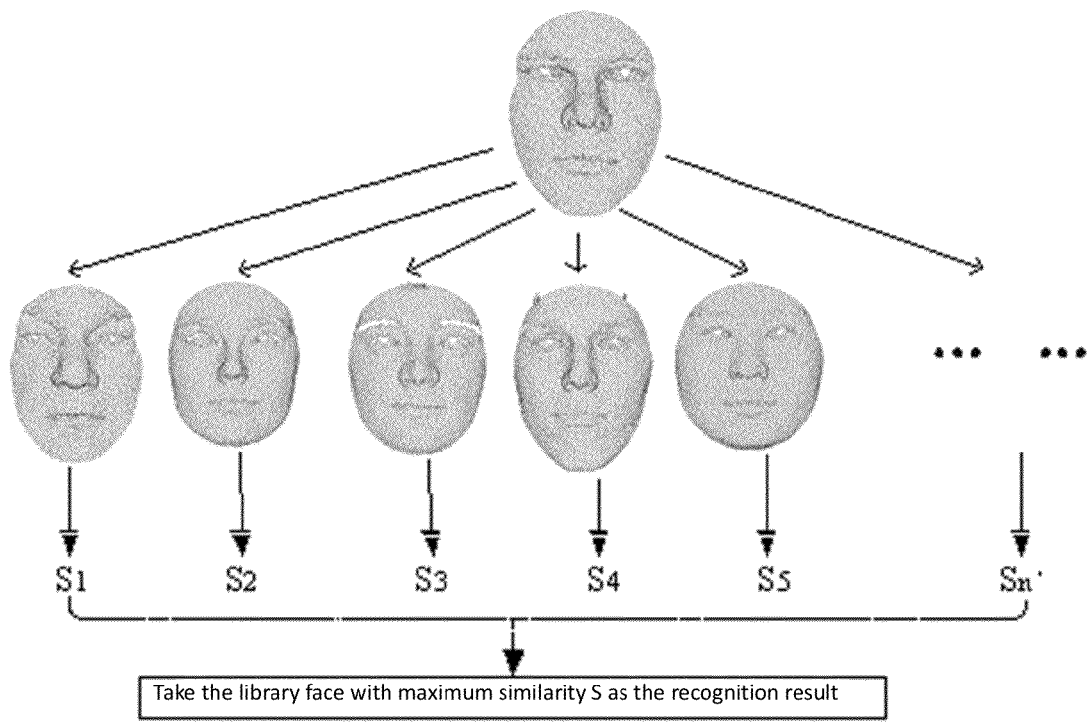
FIG. 9 is a schematic diagram of the recognition method.
Figure 10:
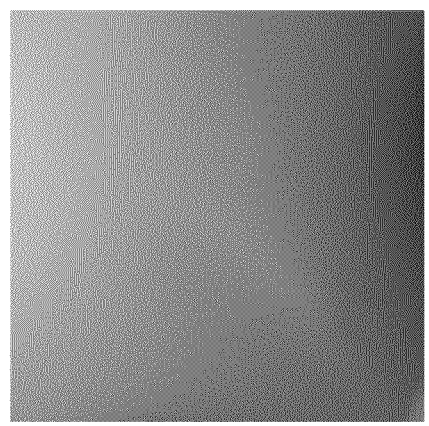
FIG. 10 shows a color rendering of the geometric image.

Hereinafter embodiments of the present invention will be detailed, with reference to the accompanying drawings. Matlab R2009a is used as the programming tool, the experimental data is obtained from a FRGC v2.0 three-dimensional face database, which is collected by the University of Notre Dame (USA), and contains 4007 three-dimensional face models of 466 persons, mainly collected in Autumn in 2003 and in Spring in 2004. In this document, the first three-dimensional facial model of each person is used as a library model, while all the other facial models are used as test models;

FIG. 1 is a flow chart of the three-dimensional face recognition method disclosed in the present invention;

FIG. 5 shows parameterized meshes, i.e., the pre-treated three-dimensional facial meshes are processed by mesh parameterization, and are mapped to two-dimensional meshes in size of 512×512 pixels in a plane;

FIG. 6 shows a gray-scale geometric image, wherein the three-dimensional coordinates of the facial mesh vertexes are appended to the corresponding vertexes of the parameterized meshes, and then the attributes of the pixels in the square are determined with a linear interpolation method, to obtain a two-dimensional geometric image with three-dimensional coordinate attributes, i.e., a facial geometric image, which is displayed in gray-scale form in this figure;

FIG. 7 is a schematic diagram of multi-scale Haar wavelet filtering. First, row transformation and column transformation are carried out for the geometric image with a Haar transformation matrix sequentially, to obtain a low frequency coefficient set and horizontal, vertical, and diagonal high frequency coefficient sets; then, the low frequency coefficient set is filtered again by Haar wavelet filtering, to output new low frequency coefficient set and new horizontal, vertical, and diagonal high frequency coefficient sets; next, the filtering is repeated for a specific number of cycles in the same way, with the low frequency coefficient set obtained in the previous wavelet filtering cycle as the input in each cycle, to output new low frequency coefficient set and new horizontal, vertical, and diagonal high frequency coefficient sets;

FIG. 8 shows horizontal, vertical, and diagonal intermediate frequency information images, wherein the horizontal, vertical, and diagonal high frequency coefficient sets outputted from the fifth Haar wavelet filtering cycle constitute horizontal, vertical, and diagonal intermediate frequency information images $HL_5$, $LH_5$, and $HH_5$;

FIG. 9 is a schematic diagram of the recognition method, wherein for one test model and n' library models, the degree of similarity between the test model and each library model is calculated, and the library model with the maximum degree of similarity is judged to be of the same identity as the test model;

FIG. 10 shows a color rendering of the geometric image. Every pixel of the geometric image has attributes of three-dimensional coordinates x, y, z; in this figure, the x, y, and z attributes are used as RGB attributes of a color image, and accordingly the geometric image is shown by a color image. The geometric image in this figure is the same geometric image shown in FIG. 6.

The processing steps of the test model and the library model include a pre-treatment step, a intermediate frequency information image extraction step, a wavelet domain structure similarity calculation step, and a recognition step.

Step 1: Make pre-treatment to the test model and the library model, wherein the pre-treatment involves:

Step 1.1 Face cutting

Locate the nose tip point according to the shape index feature and geometric constraints of the facial point cloud. The shape index $SI(u)$ feature of any point u in the facial point cloud is determined by the maximum principal curvature $\kappa_1(u)$ and the minimum principal curvature $\kappa_2(u)$ of the point:

$$SI(u) = \frac{1}{2} - \frac{1}{\pi}\tan^{-1}\frac{\kappa_1(u)+\kappa_2(u)}{\kappa_1(u)-\kappa_2(u)}.$$

The shape index feature represents the convex-concave degree of the neighboring region of a point, which is to say, the more convex the curved surface is, the higher the shape index will be. Calculate the shape index of each point in the facial point cloud, and select the connected regions constituted by the points with shape index within a range of 0.85-1.0 as initial candidate regions for the nose tip point. Calculate the centroid position of the facial point cloud, and select the connected region that is the closest to the centroid position among the candidate regions for the nose tip point as the nose tip region. Select the centroid in the noise tip region as the nose tip point.

Define a sphere with the nose tip point as the center of the sphere and 90 mm radius, discard the points outside of the sphere and keep the points within the sphere as the facial region for subsequent processing.

Step 1.2 Facial surface smoothing

Carry out posture correction for the obtained facial point cloud by principal component analysis (PCA), to obtain 3 orthogonal axial directions; take the nose tip point as the origin, choose the eigenvector corresponding to the maximum eigenvalue as Y-axis, choose the eigenvector corresponding to the minimum eigenvalue as Z-axis, establish a right-handed coordinate system and take the right-handed coordinate system as a spatial three-dimensional coordinate system, wherein each point in the facial point cloud can be denoted by coordinates x, y, and z uniquely in the coordinate system;

Project the spatial three-dimensional coordinate system to XOY plane, and then carry out two-dimensional meshing for the projected point cloud, i.e., carry out curved surface reconstitution with a 2.5 dimensional meshing algorithm for the point cloud, to obtain spatial triangular meshes $\tilde{V}$ that approximately represent the curved facial surface.

Denote the vertexes of the spatial triangular meshes $\tilde{V}$ (i.e., the points of facial point cloud in the three-dimensional coordinate system) as $v_i$, i=1, 2, ..., μ, where, μ is the number of vertexes among $\tilde{V}$; set matrix $W \in R^{\mu \times \mu}$, where, $R^{\mu \times \mu}$ represents a μ×μ real number space, and $W(i,j)=0$ if there is no side between point $v_i$ and point $v_j$, or $W(i,j)=\omega_{ij}>0$ if there is any side between point $v_i$ and point $v_j$. $\omega_{i,j}$ is cosecant weight $\omega_{i,j}=\cot(\theta_{ij})+\cot(\zeta_{ij})$ correlated with the side (i, j) between $v_i$ and $v_j$, where, $\theta_{ij}$ and $\zeta_{ij}$ represent the two angles opposite to the side (i, j) in the two neighboring triangular patches of the side (i,j). Construct a local smoothing operator $\tilde{W}=D^{-1}W$, where, $D=\text{diag}(d_i)$ and $d_i=\Sigma_{(i,j) \in B}\omega_{i,j}$, and B is the set of all boundary points among the spatial triangular meshes $\tilde{V}$. Apply $\tilde{W}$ iteratively to the spatial three-dimensional meshes $\tilde{V}$, to obtain surface-smoothed three-dimensional facial meshes $\bar{V}$:

$$\bar{V} = \tilde{W}^{10}\tilde{V}$$

Step 1.3 Cutting of upper face

Discard the points below y=−10 plane among the three-dimensional facial meshes $\bar{V}$, and keep the upper part of the face that is less affected by facial expression.

Step 1.4 Dilution of facial point cloud

Dilute the points of upper half face with a spatial sampling method. Such a data dilution method is simple but effective, can reduce the quantity of points without distortion, and can obtain points that are evenly distributed spatially. When the spatial sampling method is used, the space interval σ is determined as 1 mm in the present invention. Specifically, the dilution method is as follows:

Calculate the σ neighboring region of each point on the upper half face to be diluted, i.e., the set of points at distance to the point smaller than σ; add a flag to each point and initializes the flag to T. Starting from the first point, check whether the flag of the point is F; if the flag is F, then check the next point; if the flag is T, then check the flag of each point in the σ neighboring region, and set the flag of each point with flag=T in the neighboring region as F. Finally, delete all points with flag=F, to obtain a diluted facial model of upper half face.

Carry out triangular meshing again for the diluted facial model of upper half face, to generate η triangular patches. Calculate and save the side lengths $\gamma_{l1}$, $\gamma_{l2}$, and $\gamma_{l3}$ (l=1, 2, ..., η) of each spatial triangular patch among the generated three-dimensional facial meshes, and denote the average side length of all triangular patches as $\bar{\gamma}$; if a triangular patch has a side in length greater than $4\bar{\gamma}$, delete the triangular patch but keep the vertexes of the triangular patch.

Now, the test model and the library models have been converted to three-dimensional facial meshes with the same smoothness and density in the pretreatment process.

Step 2.1 Map the coordinate information of facial point clouds of the test model and the library model to a plane respectively, to form geometric images of the test model and the library model respectively, wherein the method for obtaining the geometric images is as follows:

Step 2.1.1 Mesh parameterization

Map the boundary points among the pre-treated three-dimensional facial point meshes to four sides of a square in size of 512×512 pixels, and map the other points among the three-dimensional facial point meshes except the boundary points to the area within the square by mesh parameterization, to obtain planar meshes $\phi$; take any vertex of the square as origin, take the directions in which two sides intersect at the origin as positive directions, and establish a counter-clockwise coordinate system MON, wherein any point in the plane can be denoted uniquely by coordinates m and n; on the four sides of the square, take b points evenly in counter-clockwise direction, starting from the origin, wherein the coordinates of the sampled points are $(m_t^0, n_t^0)$ (t=1, 2, ... b), b is the number of boundary points among the three-dimensional facial point meshes.

Denote the vertexes of the three-dimensional facial point meshes as $f_q$ (q=1, 2, ... , $\tau$), where, $\tau$ is the number of vertexes, the coordinates of corresponding points mapped from the vertexes to the area within the square are $(m_q, n_g)$, where, $m_q$ and $n_q$ are solutions of the following linear equation set:

$$\begin{cases} Lm_q = Ln_q = 0, \forall f_q \notin B \\ m_q = m_q^0, n_q = n_q^0, \forall f_q \in B \end{cases},$$

where, L is the Laplacian matrix of the three-dimensional facial point meshes, and B is the set of boundary points among the three-dimensional facial point meshes.

Step 2.1.2 Generate a geometric image

Append the three-dimensional coordinates of the vertexes $f_q = (x_q, y_q, z_q)$ among the facial point meshes to the corresponding points $(m_q, n_q)$ as attributes of the points $(m_q, n_g)$; determine the attributes of the pixel points within the area of the square by linear interpolation, to obtained a two-dimensional image with three-dimensional coordinate attributes, which is referred to as a geometric image G.

Step 2.2 Filter the geometric images G of the test model and the library model respectively, to obtain intermediate frequency information of the test model and the library model, wherein the filtering method for geometric image is as follows:

Step 2.2.1 Carry out multi-scale Haar wavelet filtering for the geometric image G Step 2.1.1.1 Divide a geometric image G in size of 512×512 pixels into blocks in size of 2×2 pixels, and carry out Haar wavelet filtering for each block with a Haar transformation matrix $$H = \frac{1}{\sqrt{2}} \begin{bmatrix} 1 & 1 \\ 1 & -1 \end{bmatrix}.$$

Represent a block in G as $$A = \begin{bmatrix} a_{11} & a_{12} \\ a_{21} & a_{22} \end{bmatrix},$$

where, $a_{11}$, $a_{12}$, $a_{21}$, and $a_{22}$ are elements in the block; carry out Haar wavelet filtering for A, i.e., carry out row transformation and column transformation sequentially for A;

$$\overline{A} = H^T A H = \begin{bmatrix} \overline{a}_{11} & \overline{a}_{12} \\ \overline{a}_{21} & \overline{a}_{22} \end{bmatrix},$$

$\overline{A}$ is the block after Haar wavelet filtering, where, $\overline{a}_{11}$ is the low frequency approximation coefficient of block A, $\overline{a}_{12}$ is the horizontal high frequency component of block A, $\overline{a}_{21}$ is the vertical high frequency component of block A, and $\overline{a}_{22}$ is the diagonal high frequency component of block A.

After all blocks of the geometric image G are treated by Haar wavelet filtering, sort the low frequency approximation coefficients of all blocks in the order of the blocks, and construct a low frequency coefficient set $LL_1$; sort the horizontal high frequency components in the order of the blocks, and construct a horizontal high frequency coefficient set $HL_1$; sort the vertical high frequency components in the order of the blocks, and construct a vertical high frequency coefficient set $LH_1$; sort the diagonal high frequency components in the order of the blocks, and construct a diagonal high frequency coefficient set $HH_1$.

Step 2.1.1.2 Carry out Haar wavelet filtering again for the low frequency coefficient set $LL_1$ in the same way as that in step 2.1.1.1, and output secondarily filtered low frequency coefficient set and horizontal, vertical, and diagonal high frequency coefficient sets, which are denoted as $LL_2$, $HL_2$, $LH_2$, and $HH_2$ respectively. Repeat the filtering for 5 cycles in the same way, with the low frequency coefficient set outputted in the previous filtering cycle as input in each cycle, and output new low frequency coefficient set and new horizontal, vertical, and diagonal high frequency coefficient sets.

Step 2.2.2 Extract intermediate frequency information images

Extract and save the horizontal high frequency coefficient set $HL_5$, vertical high frequency coefficient set $LH_5$, and diagonal high frequency coefficient set $HH_5$ that are outputted in the last filtering cycle, take the elements in $HL_5$, $LH_5$, and $HH_5$ as attributes of the pixels, and construct three images in size of 16×16 pixels, which are referred to as horizontal intermediate frequency information image, vertical intermediate frequency information image, and diagonal intermediate frequency information image respectively;

Now, the three-dimensional facial meshes have been converted into horizontal, vertical, and diagonal intermediate frequency information images, and the matching between the test model and the library model has been translated into matching between corresponding intermediate frequency information images.

Step 3: Calculate the degree of similarity between the test model and the library model with wavelet domain structure similarity algorithm respectively, wherein the calculation method is as follows:

Step 3.1 Calculate the degree of similarity $S_{HL}$ between the horizontal intermediate frequency information image of the test model and the horizontal intermediate frequency information image of the library model, the degree of similarity $S_{LH}$ between the vertical intermediate frequency information image of the test model and the vertical intermediate frequency information image of the library model, and the degree of similarity $S_{HH}$ between the diagonal intermediate frequency information image of the test model and the diagonal intermediate frequency information image of the library model, sum up $S_{HL}$, $S_{LH}$, and $S_{HH}$, and take the sum as the degree of similarity between the test model and the library model, wherein the $S_{HL}$, $S_{LH}$, and $S_{HH}$ are obtained with the horizontal intermediate frequency information image, vertical intermediate frequency information image, and diagonal intermediate frequency information image to be matched and are calculated with wavelet domain structure similarity algorithm; the wavelet domain structure similarity algorithm is as follows:

Step 3.1.1 Sort the x attribute of all pixels in the horizontal intermediate frequency information image, vertical intermediate frequency information image, and diagonal intermediate frequency information image by the order of corresponding pixel respectively, according to the three attributes (x,y,z) of each pixel in the horizontal intermediate frequency information image, vertical intermediate frequency information image, and diagonal intermediate frequency information image, and construct an x channel for the horizontal intermediate frequency information image, vertical intermediate frequency information image, and diagonal intermediate frequency information image respectively; in the same way, construct and obtain y channels and z channels for the horizontal intermediate frequency information image, vertical intermediate frequency information image, and diagonal intermediate frequency information image, and denote the channels as:

$$C^\chi = \begin{bmatrix} c_{1,1} & c_{1,2} & \cdots & c_{1,16} \\ c_{2,1} & c_{2,2} & \cdots & c_{2,16} \\ \vdots & \vdots & \ddots & \vdots \\ c_{16,1} & c_{16,2} & \cdots & c_{16,16} \end{bmatrix},$$

where, $\chi$ is x, y, or z, $C^\chi$ represents x channel, y channel, or z channel, $c_{1,2}$ is the element in row 1 and column 1 in $C^\chi$, $c_{1,2}$ is the element in row 1 and column 2 in $C^\chi$, ..., $C_{21}$ is the element in row 2 and column 1 in $C^\chi$, ..., and $c_{16,16}$ is the element in row 16 and column 16 in $C^\chi$; the horizontal intermediate frequency information image, vertical intermediate frequency information image, or diagonal intermediate frequency information image is referred to as an intermediate frequency information image; calculate the degree of similarity $s^x$ of x channel, degree of similarity $s^y$ of y channel, and degree of similarity $s^z$ of z channel between two intermediate frequency information images to be matched, sum up $s^x$, $s^y$, and $s^z$, and take the sum as the degree of similarity $S_{HL}$, $S_{LH}$, or $S_{HH}$ between the two intermediate frequency information images to be matched, wherein the $s^x$, $s^y$, and $s^z$ are obtained with the following method:

The x, y, or z channel of an intermediate frequency information image of the test model is represented by $$C_p^\chi = \begin{bmatrix} c_{1,1}^p & c_{1,2}^p & \cdots & c_{1,16}^p \\ c_{2,1}^p & c_{2,2}^p & \cdots & c_{2,16}^p \\ \vdots & \vdots & \ddots & \vdots \\ c_{16,1}^p & c_{16,2}^p & \cdots & c_{16,16}^p \end{bmatrix},$$

and the same channel of the corresponding intermediate frequency information image of the library model is represented by $$C_g^\chi = \begin{bmatrix} c_{1,1}^g & c_{1,2}^g & \cdots & c_{1,16}^g \\ c_{2,1}^g & c_{2,2}^g & \cdots & c_{2,16}^g \\ \vdots & \vdots & \ddots & \vdots \\ c_{16,1}^g & c_{16,2}^g & \cdots & c_{16,16}^g \end{bmatrix},$$

where, p indicates $C_p^\chi$ comes from the test model, g indicates $C_g^\chi$ comes from the library model; the number of rows and number of columns of elements in $C_p^\chi$ and $C_g^\chi$ are denoted as $\alpha$ and $\beta$ respectively, a 3×3 pixel neighboring region in $C_p^\chi$ is represented by $$C_p^\chi(\alpha, \beta) = \begin{bmatrix} c_{\alpha-1,\beta-1}^p & c_{\alpha-1,\beta}^p & c_{\alpha-1,\beta+1}^p \\ c_{\alpha,\beta-1}^p & c_{\alpha,\beta}^p & c_{\alpha,\beta-1}^p \\ c_{\alpha+1,\beta-1}^p & c_{\alpha+1,\beta}^p & c_{\alpha+1,\beta+1}^p \end{bmatrix},$$

the element $c_{\alpha,\beta}^p$ is the central element in the 3×3 pixel neighboring region in $C_p^\chi$, a 3×3 pixel neighboring region in $C_g^\chi$ is represented by $$C_g^\chi(\alpha, \beta) = \begin{bmatrix} c_{\alpha-1,\beta-1}^g & c_{\alpha-1,\beta}^g & c_{\alpha-1,\beta+1}^g \\ c_{\alpha,\beta-1}^g & c_{\alpha,\beta}^g & c_{\alpha,\beta+1}^g \\ c_{\alpha+1,\beta-1}^g & c_{\alpha+1,\beta}^g & c_{\alpha+1,\beta+1}^g \end{bmatrix},$$

the element $c_{\alpha,\beta}^g$ the central element in the 3×3 pixel neighboring region in $C_g^\chi$, and the structure similarity $\tilde{s}^\chi(\alpha,\beta)$ between $c_{\alpha,\beta}^p$ and $c_{\alpha,\beta}^g$ is:

$$\tilde{s}^\chi(\alpha, \beta) = \frac{\left(2\sum_{e1=\alpha-1}^{\alpha+1}\sum_{e2=\beta-1}^{\beta+1} |c_{e1,e2}^p||c_{e1,e2}^g| + 0.1\right)\left(2\left|\sum_{e1=\alpha-1}^{\alpha+1}\sum_{e2=\beta-1}^{\beta+1} c_{e1,e2}^p(c_{e1,e2}^g)^*\right| + 0.1\right)}{\left(\sum_{e1=\alpha-1}^{\alpha+1}\sum_{e2=\beta-1}^{\beta+1} |c_{e1,e2}^p|^2 + \sum_{e1=\alpha-1}^{\alpha+1}\sum_{e2=\beta-1}^{\beta+1} |c_{e1,e2}^g|^2 + 0.1\right)\left(2\sum_{e1=\alpha-1}^{\alpha+1}\sum_{e2=\beta-1}^{\beta+1} |c_{e1,e2}^p(c_{e1,e2}^g)^*| + 0.1\right)}$$

where, e1 and e2 represent the row suffix and column suffix of the elements in $C_p^\chi(\alpha,\beta)$ and $C_g^\chi(\alpha,\beta)$, and $(c_{e1,e2}^g)^*$ is the conjugate value of $c_{e1,e2}^g$;

Let $\alpha=2, 3, \ldots, 15$, $\beta=2, 3, \ldots, 15$, take the average of $\tilde{s}^\chi(\alpha,\beta)$ as the structure similarity between $C_p^\chi$ and $C_g^\chi$:

$$s^\chi = \frac{1}{196}\sum_{\alpha=2}^{15}\sum_{\beta=2}^{15} \tilde{s}^\chi(\alpha, \beta).$$

Step 4: Three-dimensional face recognition

Repeat steps 1 to 3, to obtain the degree of similarity between the test model and each library model, compare the degrees of similarity between the test model and the library models, and judge that the library model with the maximum degree of similarity is of the same identity as the test model.

The invention claimed is:

1. A three-dimensional face recognition method based on intermediate frequency information in a geometric image, the method comprising:
   step 1: making a pre-treatment to a test model and a pre-treatment of a library model, wherein the making of either pre-treatment involves:
      step 1.1 face cutting:
         locate a nose tip point from a plurality of points according to a shape index feature and geometric constraints of a facial point cloud, define a sphere with the nose tip point as a center of the sphere and a radius of 90 mm, discard outside points of the plurality of points that are outside of the sphere, wherein the facial point cloud comprising the points that are within the sphere;

step 1.2 facial surface smoothing:

carry out posture correction for the facial point cloud by principal component analysis (PCA), to obtain 3 orthogonal axial directions; take the nose tip point as an origin, choose a first eigenvector corresponding to a maximum eigenvalue as Y-axis, choose a second eigenvector corresponding to a minimum eigenvalue as Z-axis, establish a right-handed spatial three-dimensional coordinate system, wherein each point in the facial point cloud can be denoted by coordinates x, y, and z uniquely in the right-handed spatial three-dimensional coordinate system; and carry out triangularization for the facial point cloud in the right-handed spatial three-dimensional coordinate system, to obtain spatial triangular meshes; smooth the facial triangular meshes with a mesh-based smoothing algorithm for 10 iterations for noise removal, to obtain surface smoothed three-dimensional facial meshes;

step 1.3 cutting of upper face discard the points below a y=−10 plane among the three-dimensional facial meshes, and keep an upper part of the three-dimensional face that is less affected by a facial expression; and step 1.4 diluting of facial point cloud:

take samples from the facial point cloud evenly by a spatial distance at 1 mm interval, to obtain a diluted point cloud; carry out triangular meshing for the diluted point cloud, calculate and save side lengths $\gamma_{l1}, \gamma_{l2}, \gamma_{l3}$ (l=1, 2, ..., η) of each spatial triangular patch among the three-dimensional facial meshes, where, η is a number of the spatial triangular patches among the three-dimensional facial meshes, and an average side length among all triangular patches is $\bar{\gamma}$; if any spatial triangular patch has a side in length greater than $4\bar{\gamma}$, discard the spatial triangular patch but keep vertexes of the spatial triangular patch;

step 2 mapping and extending of intermediate frequency information in a geometric image:

step 2.1 mapping the coordinate information of facial point clouds of the test model and the library model to a plane respectively, to form geometric images of the test model and the library model respectively, wherein the method for obtaining the geometric images is as follows:

step 2.1.1 mesh parameterization:

map boundary points among the pre-treatment of the three-dimensional facial meshes to four sides of a square with a size of 512×512 pixels, and map non-boundary points among the three-dimensional facial meshes except the boundary points to an area within the square by mesh parameterization, to obtain planar meshes φ; take any vertex of the square as origin, take the directions in which two sides intersect at the origin as positive directions, and establish a counter-clockwise coordinate system MON, wherein any point in the plane can be denoted uniquely by coordinates m and n; on the four sides of the square, take b points evenly in a counter-clockwise direction, starting from the origin, wherein the coordinates of the samples are $(m_t^0, n_t^0)$ (t=1, 2, ... b), b is a number of boundary points among the three-dimensional facial meshes; and denote the vertexes of the three-dimensional facial meshes as $f_q$ (q=1, 2, ..., τ), where, τ is a number of vertexes, coordinates of corresponding points mapped from the vertexes to the area within the square are $(m_q, n_q)$, where, $m_q$ and $n_q$ are solutions of the following linear equation set:

$$\begin{cases} Lm_q = Ln_q = 0, \forall f_q \notin B \\ m_q = m_q^0, n_q = n_q^0, \forall f_q \in B \end{cases},$$

where, L is a Laplacian matrix of the three-dimensional facial meshes, and B is the boundary points among the three-dimensional facial meshes; and step 2.1.2 generating a geometric image:

append the three-dimensional coordinates of the vertexes $f_q = (x_q, y_q, z_q)$ among the three-dimensional facial meshes to the corresponding points $(m_q, n_q)$ as attributes of the points $(m_q, n_q)$; determine the attributes of the points within the area within the square by linear interpolation, to obtain a two-dimensional image with three-dimensional coordinate attributes, which is referred to as a geometric image G; and step 2.2 Filter the geometric images G of the test model and the library model respectively, to obtain intermediate frequency information of the test model and the library model, wherein, a method of filtering geometric image is as follows:

step 2.2.1 carrying out multi-scale Haar wavelet filtering for a geometric image G:

step 2.2.1.1 carrying out row transformation and column transformation for the geometric image G with a Haar transformation matrix sequentially, to obtain a low frequency coefficient set and horizontal, vertical, and diagonal high frequency coefficient sets; denote the low frequency coefficient set as $LL_1$, and denote the horizontal, vertical, and diagonal high frequency coefficient sets as $HL_1$, $LH_1$, and $HH_1$ respectively; and step 2.2.1.2 carrying out Haar wavelet filtering for the low frequency coefficient set $LL_1$ again as that described in step 2.2.1.1, and output secondarily filtered low frequency coefficient set and horizontal, vertical, and diagonal high frequency coefficient sets, which are denoted as $LL_2$, $HL_2$, $LH_2$, and $HH_2$ respectively; repeat the filtering for 5 cycles, with the low frequency coefficient set obtained in a previous cycle as an input in each filtering cycle, and output new low frequency coefficient set and horizontal, vertical, and diagonal high frequency coefficient sets; and step 2.2.2 extracting intermediate frequency information from a geometric image:

extracting and saving a horizontal high frequency coefficient set $HL_5$, vertical high frequency coefficient set $LH_5$, and diagonal high frequency coefficient set $HH_5$ that are outputted in a final filtering cycle, take $HL_5$, $LH_5$, and $HH_5$ as attributes of the pixels, and construct three images in size of 16×16 pixels, which are referred to as horizontal intermediate frequency information image, vertical intermediate frequency information image, and diagonal intermediate frequency information image respectively;

step 3: calculating a degree of similarity between the test model and the library model with wavelet domain structure similarity algorithm respectively, wherein a method of calculation is as follows:

step 3.1 calculating an HL degree of similarity $S_{HL}$ between the horizontal intermediate frequency information image of the test model and the horizontal intermediate frequency information image of the library model, a LH degree of similarity $S_{LH}$ between the vertical intermediate frequency information image of the test model and the vertical intermediate frequency information image of the library model, and an HH degree of similarity $S_{HH}$ between the diagonal intermediate frequency information image of the test model and the diagonal intermediate frequency information image of the library model, sum up $S_{HL}$, $S_{LH}$, and $S_{HH}$, and take the sum as the degree of similarity between the test model and the library model, wherein the $S_{HL}$, $S_{LH}$, and $S_{HH}$ are obtained with the horizontal intermediate frequency information image, vertical intermediate frequency information image, and diagonal intermediate frequency information image to be matched and are calculated with wavelet domain structure similarity algorithm; the wavelet domain structure similarity algorithm is as follows:

step 3.1.1 sorting the x of all pixels in the horizontal intermediate frequency information image, vertical intermediate frequency information image, and diagonal intermediate frequency information image in an order of corresponding pixel respectively, according to the three attributes (x,y,z) of each pixel in the horizontal intermediate frequency information image, vertical intermediate frequency information image, and diagonal intermediate frequency information image, and construct an x channel for the horizontal intermediate frequency information image, vertical intermediate frequency information image, and diagonal intermediate frequency information image respectively; construct and obtain y channels and z channels, similarly, for the horizontal intermediate frequency information image, vertical intermediate frequency information image, and diagonal intermediate frequency information image, and denote the channels as:

$$C^{\chi} = \begin{bmatrix} c_{1,1} & c_{1,2} & \cdots & c_{1,16} \\ c_{2,1} & c_{2,2} & \cdots & c_{2,16} \\ \vdots & \vdots & \ddots & \vdots \\ c_{16,1} & c_{16,2} & \cdots & c_{16,16} \end{bmatrix},$$

where, $\chi$ is x, y, or z, $C^{\chi}$ represents x channel, y channel, or z channel, $c_{1,1}$ is an element in row 1 and column 1 in $C^{\chi}$, $c_{1,2}$ is an element in row 1 and column 2 in $C^{\chi}$, ..., $c_{2,1}$ is an element in row 2 and column 1 in $C^{\chi}$, ..., and $C_{16,16}$ is an element in row 16 and column 16 in $C^{\chi}$; the horizontal intermediate frequency information image, vertical intermediate frequency information image, or diagonal intermediate frequency information image is referred to as an intermediate frequency information image; calculate a degree of similarity $s^x$ of x channel, a degree of similarity $s^y$ of y channel, and a degree of similarity $s^z$ of z channel between two intermediate frequency information images to be matched, sum $s^x$, $s^y$, and $s^z$, and take the sum as the degree of similarity $S_{HL}$, $S_{LH}$, or $S_{HH}$ between the two intermediate frequency information images to be matched, wherein the $s^x$, $s^y$, and $s^z$ are obtained with the following method:

the x, y, or z channel of the intermediate frequency information image of the test model is represented by $$C_p^{\chi} = \begin{bmatrix} c_{1,1}^p & c_{1,2}^p & \cdots & c_{1,16}^p \\ c_{2,1}^p & c_{2,2}^p & \cdots & c_{2,16}^p \\ \vdots & \vdots & \ddots & \vdots \\ c_{16,1}^p & c_{16,2}^p & \cdots & c_{16,16}^p \end{bmatrix},$$

and a same channel of the corresponding intermediate frequency information image of the library model is represented by $$C_g^{\chi} = \begin{bmatrix} c_{1,1}^g & c_{1,2}^g & \cdots & c_{1,16}^g \\ c_{2,1}^g & c_{2,2}^g & \cdots & c_{2,16}^g \\ \vdots & \vdots & \ddots & \vdots \\ c_{16,1}^g & c_{16,2}^g & \cdots & c_{16,16}^g \end{bmatrix},$$

where, p indicates $C_p^{\chi}$ comes from the test model, g indicates $C_g^{\chi}$ comes from the library model; a number of rows and a number of columns of elements in $C_p^{\chi}$ and $C_g^{\chi}$ are denoted as $\alpha$ and $\beta$ respectively, a 3×3 pixel neighboring region in $C_p^{\chi}$ is represented by $$C_p^{\chi}(\alpha, \beta) = \begin{bmatrix} c_{\alpha-1,\beta-1}^p & c_{\alpha-1,\beta}^p & c_{\alpha-1,\beta+1}^p \\ c_{\alpha,\beta+1}^p & c_{\alpha,\beta}^p & c_{\alpha,\beta+1}^p \\ c_{\alpha+1,\beta+1}^p & c_{\alpha+1,\beta}^p & c_{\alpha+1,\beta+1}^p \end{bmatrix},$$

the element $c_{\alpha,\beta}^p$ is a central element in the 3×3 pixel neighboring region in $C_p^{\chi}$, a 3×3 pixel neighboring region in $C_g^{\chi}$ is represented by $$C_g^{\chi}(\alpha, \beta) = \begin{bmatrix} c_{\alpha-1,\beta-1}^g & c_{\alpha-1,\beta}^g & c_{\alpha-1,\beta+1}^g \\ c_{\alpha,\beta+1}^g & c_{\alpha,\beta}^g & c_{\alpha,\beta+1}^g \\ c_{\alpha+1,\beta+1}^g & c_{\alpha+1,\beta}^g & c_{\alpha+1,\beta+1}^g \end{bmatrix},$$

the element $c_{\alpha,\beta}^g$ is a central element in the 3×3 pixel neighboring region in $C_g^{\chi}$, and the structure similarity $\tilde{s}^{\chi}(\alpha,\beta)$ between $c_{\alpha,\beta}^p$, and $c_{\alpha,\beta}^g$ is:

$$\tilde{s}^{\chi}(\alpha, \beta) = \frac{\left(2\sum_{e1=\alpha-1}^{\alpha+1}\sum_{e2=\beta-1}^{\beta+1}|c_{e1,e2}^p||c_{e1,e2}^g|+0.1\right)\left(2\left|\sum_{e1=\alpha-1}^{\alpha+1}\sum_{e2=\beta-1}^{\beta+1}c_{e1,e2}^p(c_{e1,e2}^g)^*\right|+0.1\right)}{\left(\sum_{e1=\alpha-1}^{\alpha+1}\sum_{e2=\beta-1}^{\beta+1}|c_{e1,e2}^p|^2+\sum_{e1=\alpha-1}^{\alpha+1}\sum_{e2=\beta-1}^{\beta+1}|c_{e1,e2}^g|^2+0.1\right)\left(2\sum_{e1=\alpha-1}^{\alpha+1}\sum_{e2=\beta-1}^{\beta+1}|c_{e1,e2}^p(c_{e1,e2}^g)^*|+0.1\right)}$$

where, e1 and e2 represent a row suffix and a column suffix of the elements in $C_p^{\chi}(\alpha,\beta)$ and $C_g^{\chi}(\alpha,\beta)$ and $(c_{e1,e2}^g)^*$ is a conjugate value of $c_{e1,e2}^g$;

Let
α=2, 3, ..., 15, β=2, 3, ..., 15, take the average of $\tilde{s}^\chi(\alpha,\beta)$ as the structure similarity between $C_p^\chi$ and $C_g^\chi$:

$$s^\chi = \frac{1}{196}\sum_{\alpha=2}^{15}\sum_{\beta=2}^{15}\tilde{s}^\chi(\alpha,\beta);$$

and
- step 4: identity recognizing of three-dimensional face:
  repeat steps 1 to 3, to obtain the degree of similarity between the test model and each library model, compare the degrees of similarity between the test model and the library models, and judge that the library model with a maximum degree of similarity is a same identity as the test model.

2. A three-dimensional facial recognition system comprising:
   a processor; and
   a memory, wherein the memory stores instructions that, when executed by the processor, cause the processor to perform the following steps:
   step 1: making a pre-treatment of a test model and a pre-treatment of a library model, wherein the making of either pre-treatment involves:
   step 1.1 face cutting:
   locate a nose tip point from a plurality of points according to a shape index feature and geometric constraints of a facial point cloud, define a sphere with the nose tip point as a center of the sphere and a radius of 90 mm, discard outside points of the plurality of points that are outside of the sphere, wherein the facial point cloud comprising the points that are within the sphere;
   step 1.2 facial surface smoothing:
   carry out posture correction for the facial point cloud by principal component analysis (PCA), to obtain 3 orthogonal axial directions; take the nose tip point as an origin, choose a first eigenvector corresponding to a maximum eigenvalue as Y-axis, choose a second eigenvector corresponding to a minimum eigenvalue as Z-axis, establish a right-handed spatial three-dimensional coordinate system, wherein each point in the facial point cloud can be denoted by coordinates x, y, and z uniquely in the right-handed spatial three-dimensional coordinate system; and
   carry out triangularization for the facial point cloud in the right-handed spatial three-dimensional coordinate system, to obtain spatial triangular meshes; smooth the facial triangular meshes with a mesh-based smoothing algorithm for 10 iterations for noise removal, to obtain surface smoothed three-dimensional facial meshes;
   step 1.3 cutting of upper face
   discard the points below a y=−10 plane among the three-dimensional facial meshes, and keep an upper part of the three-dimensional face that is less affected by a facial expression; and
   step 1.4 diluting of facial point cloud:
   take samples from the facial point cloud evenly by a spatial distance at 1 mm interval, to obtain a diluted point cloud; carry out triangular meshing for the diluted point cloud, calculate and save side lengths $\gamma_{l1}, \gamma_{l2}, \gamma_{l3}$ (l=1, 2, ..., η) of each spatial triangular patch among the three-dimensional facial meshes, where, η is a number of the spatial triangular patches among the three-dimensional facial meshes, and an average side length among all triangular patches is $\bar{\gamma}$; if any spatial triangular patch has a side in length greater than $4\bar{\gamma}$, discard the spatial triangular patch but keep vertexes of the spatial triangular patch;
   step 2 mapping and extracting of intermediate frequency information in a geometric image:
   step 2.1 mapping the coordinate information of facial point clouds of the test model and the library model to a plane respectively, to form geometric images of the test model and the library model respectively, wherein the method for obtaining the geometric images is as follows:
   step 2.1.1 meshing parameterization:
   map boundary points among the pre-treatment of the three-dimensional facial meshes to four sides of a square with a size of 512×512 pixels, and map non-boundary points among the three-dimensional facial meshes except the boundary points to an area within the square by mesh parameterization, to obtain planar meshes φ; take any vertex of the square as origin, take the directions in which two sides intersect at the origin as positive directions, and establish a counter-clockwise coordinate system MON, wherein any point in the plane can be denoted uniquely by coordinates m and n; on the four sides of the square, take b points evenly in a counter-clockwise direction, starting from the origin, wherein the coordinates of the samples are $(m_t^0, n_t^0)$ (t=1, 2, ... b), b is a number of boundary points among the three-dimensional facial meshes; and
   denote the vertexes of the three-dimensional facial meshes as $f_q$ (q=1, 2, ..., τ), where, τ is a number of vertexes, coordinates of corresponding points mapped from the vertexes to the area within the square are $(m_q, n_q)$, where, $m_q$ and $n_q$ are solutions of the following linear equation set:

$$\begin{cases} Lm_q = Ln_q = 0, \forall f_q \notin B \\ m_q = m_q^0, n_q = n_q^0, \forall f_q \in B, \end{cases}$$

where, L is a Laplacian matrix of the three-dimensional facial meshes, and B is the boundary points among the three-dimensional facial meshes; and
   step 2.1.2 generating a geometric image:
   append the three-dimensional coordinates of the vertexes $f_q=(x_q, y_q, z_q)$ among the three-dimensional facial meshes to the corresponding points $(m_q, n_q)$ as attributes of the points $(m_q, n_q)$; determine the attributes of the points within the area within the square by linear interpolation, to obtain a two-dimensional image with three-dimensional coordinate attributes, which is referred to as a geometric image G; and
   step 2.2 Filter the geometric images G of the test model and the library model respectively, to obtain intermediate frequency information of the test model and the library model, wherein a method of filtering geometric image is as follows:
   step 2.2.1 carrying out multi-scale Haar wavelet filtering for a geometric image G:
   step 2.2.1.1 carrying out row transformation and column transformation for the geometric image G with a Haar transformation matrix sequentially, to obtain a low frequency coefficient set and horizontal, vertical, and diagonal high frequency coefficient sets; denote the low frequency coefficient set as $LL_1$, and denote the horizontal, vertical, and diagonal high frequency coefficient sets as $HL_1$, $LH_1$, and $HH_1$ respectively; and step 2.2.1.2 carrying out Haar wavelet filtering for the low frequency coefficient set $LL_1$ again as that described in step 2.2.1.1, and output secondarily filtered low frequency coefficient set and horizontal, vertical, and diagonal high frequency coefficient sets, which are denoted as $LL_2$, $HL_2$, $LH_2$, and $HH_2$ respectively; repeat the filtering for 5 cycles, with the low frequency coefficient set obtained in a previous cycle as an input in each filtering cycle, and output new low frequency coefficient set and horizontal, vertical, and diagonal high frequency coefficient sets; and step 2.2.2 extracting intermediate frequency information from a geometric image:

extracting and saving a horizontal high frequency coefficient set $HL_5$, vertical high frequency coefficient set $LH_5$, and diagonal high frequency coefficient set $HH_5$ that are outputted in a final filtering cycle, take $HL_5$, $LH_5$, and $HH_5$ as attributes of the pixels, and construct three images in size of 16×16 pixels, which are referred to as horizontal intermediate frequency information image, vertical intermediate frequency information image, and diagonal intermediate frequency information image respectively;

step 3: calculating a degree of similarity between the test model and the library model with wavelet domain structure similarity algorithm respectively, wherein a method of calculation is as follows:

step 3.1 calculating an HL degree of similarity $S_{HL}$ between the horizontal intermediate frequency information image of the test model and the horizontal intermediate frequency information image of the library model, a LH degree of similarity $S_{LH}$ between the vertical intermediate frequency information image of the test model and the vertical intermediate frequency information image of the library model, and an HH degree of similarity $S_{HH}$ between the diagonal intermediate frequency information image of the test model and the diagonal intermediate frequency information image of the library model, sum up $S_{HL}$, $S_{LH}$, and $S_{HH}$, and take the sum as the degree of similarity between the test model and the library model, wherein the $S_{HL}$, $S_{LH}$, and $S_{HH}$ are obtained with the horizontal intermediate frequency information image, vertical intermediate frequency information image, and diagonal intermediate frequency information image to be matched and are calculated with wavelet domain structure similarity algorithm; the wavelet domain structure similarity algorithm is as follows:

step 3.1.1 sorting the x of all pixels in the horizontal intermediate frequency information image, vertical intermediate frequency information image, and diagonal intermediate frequency information image in an order of corresponding pixel respectively, according to the three attributes (x,y,z) of each pixel in the horizontal intermediate frequency information image, vertical intermediate frequency information image, and diagonal intermediate frequency information image, and construct an x channel for the horizontal intermediate frequency information image, vertical intermediate frequency information image, and diagonal intermediate frequency information image respectively; construct and obtain y channels and z channels, similarly, for the horizontal intermediate frequency information image, vertical intermediate frequency information image, and diagonal intermediate frequency information image, and denote the channels as:

$$C^{\chi} = \begin{bmatrix} c_{1,1} & c_{1,2} & \cdots & c_{1,16} \\ c_{2,1} & c_{2,2} & \cdots & c_{2,16} \\ \vdots & \vdots & \ddots & \vdots \\ c_{16,1} & c_{16,2} & \cdots & c_{16,16} \end{bmatrix},$$

where, $\chi$ is x, y, or z, $C^{\chi}$ represents x channel, y channel, or z channel, $c_{1,1}$ is an element in row 1 and column 1 in $C^{\chi}$, $c_{1,2}$ is an element in row 1 and column 2 in $C^{\chi}$, ..., $c_{2,1}$ is an element in row 2 and column 1 in $C^{\chi}$, ..., and $c_{16,16}$ is an element in row 16 and column 16 in $C^{\chi}$; the horizontal intermediate frequency information image, vertical intermediate frequency information image, or diagonal intermediate frequency information image is referred to as an intermediate frequency information image; calculate a degree of similarity $s^x$ of x channel, a degree of similarity $s^y$ of y channel, and a degree of similarity $s^z$ of z channel between two intermediate frequency information images to be matched, sum $s^x$, $s^y$, and $s^z$, and take the sum as the degree of similarity $S_{HL}$, $S_{LH}$, or $S_{HH}$ between the two intermediate frequency information images to be matched, wherein the $s^x$, $s^y$, and $s^z$ are obtained with the following method:

the x, y, or z channel of the intermediate frequency information image of the test model is represented by $$C_p^{\chi} = \begin{bmatrix} c_{1,1}^p & c_{1,2}^p & \cdots & c_{1,16}^p \\ c_{2,1}^p & c_{2,2}^p & \cdots & c_{2,16}^p \\ \vdots & \vdots & \ddots & \vdots \\ c_{16,1}^p & c_{16,2}^p & \cdots & c_{16,16}^p \end{bmatrix},$$

and a same channel of the corresponding intermediate frequency information image of the library model is represented by $$C_g^{\chi} = \begin{bmatrix} c_{1,1}^g & c_{1,2}^g & \cdots & c_{1,16}^g \\ c_{2,1}^g & c_{2,2}^g & \cdots & c_{2,16}^g \\ \vdots & \vdots & \ddots & \vdots \\ c_{16,1}^g & c_{16,2}^g & \cdots & c_{16,16}^g \end{bmatrix},$$

where, p indicates $C_p^{\chi}$ comes from the test model, g indicates $C_g^{\chi}$ comes from the library model; a number of rows and a number of columns of elements in $C_p^{\chi}$ and $C_g^{\chi}$ are denoted as $\alpha$ and $\beta$ respectively, a 3×3 pixel neighboring region in $C_p^{\chi}$ is represented by $$C_p^{\chi}(\alpha, \beta) = \begin{bmatrix} c_{\alpha-1,\beta-1}^p & c_{\alpha-1,\beta}^p & c_{\alpha-1,\beta+1}^p \\ c_{\alpha,\beta-1}^p & c_{\alpha,\beta}^p & c_{\alpha,\beta+1}^p \\ c_{\alpha+1,\beta-1}^p & c_{\alpha+1,\beta}^p & c_{\alpha+1,\beta+1}^p \end{bmatrix},$$

the element $c_{\alpha,\beta}^p$ is a central element in the 3×3 pixel neighboring region in $C_p^\chi$, a 3×3 pixel neighboring region in $C_g^\chi$ is represented by $$C_g^\chi(\alpha, \beta) = \begin{bmatrix} c_{\alpha-1,\beta-1}^g & c_{\alpha-1,\beta}^g & c_{\alpha-1,\beta+1}^g \\ c_{\alpha,\beta-1}^g & c_{\alpha,\beta}^g & c_{\alpha,\beta+1}^g \\ c_{\alpha+1,\beta-1}^g & c_{\alpha+1,\beta}^g & c_{\alpha+1,\beta+1}^g \end{bmatrix},$$

the element $C_{\alpha,\beta}^g$ is a central element in the 3×3 pixel neighboring region in $C_g^\chi$, and the structure similarity $\tilde{s}^\chi(\alpha,\beta)$ between $c_{\alpha,\beta}^p$ and $c_{\alpha,\beta}^g$ is:

$$\tilde{s}^\chi(\alpha, \beta) = \frac{\left(2\sum_{e1=\alpha-1}^{\alpha+1}\sum_{e2=\beta-1}^{\beta+1}|c_{e1,e2}^p||c_{e1,e2}^g|+0.1\right)\left(2\left|\sum_{e1=\alpha-1}^{\alpha+1}\sum_{e2=\beta-1}^{\beta+1}c_{e1,e2}^p(c_{e1,e2}^g)^*\right|+0.1\right)}{\left(\sum_{e1=\alpha-1}^{\alpha+1}\sum_{e2=\beta-1}^{\beta+1}|c_{e1,e2}^p|^2+\sum_{e1=\alpha-1}^{\alpha+1}\sum_{e2=\beta-1}^{\beta+1}|c_{e1,e2}^p|^2+0.1\right)\left(2\sum_{e1=\alpha-1}^{\alpha+1}\sum_{e2=\beta-1}^{\beta+1}|c_{e1,e2}^p(c_{e1,e2}^g)^*|+0.1\right)}$$

where, e1 and e2 represent a row suffix and a column suffix of the elements in $C_p^\chi(\alpha,\beta)$ and $C_g^\chi(\alpha,\beta)$, and $(c_{e1,e2}^g)^*$ is a conjugate value of $c_{c1,c2}^g$;

Let $\alpha=2, 3, \ldots, 15, \beta=2, 3, \ldots, 15$, take the average of $\tilde{s}^\chi(\alpha,\beta)$ as the structure similarity between $C_p^\chi$ and $C_g^\chi$:

$$s^\chi = \frac{1}{196}\sum_{\alpha=2}^{15}\sum_{\beta=2}^{15}\tilde{s}^\chi(\alpha, \beta);$$

and step 4: identity recognizing of three-dimensional face:

repeat steps 1 to 3, to obtain the degree of similarity between the test model and each library model, compare the degrees of similarity between the test model and the library models, and judge that the library model with a maximum degree of similarity is a same identity as the test model.

\* \* \* \* \*